(12) United States Patent
Schmitt

(10) Patent No.: US 7,285,210 B2
(45) Date of Patent: Oct. 23, 2007

(54) ZERO WASTE REVERSE OSMOSIS WATER FILTERING

(75) Inventor: Craig A. Schmitt, Phoenix, AZ (US)

(73) Assignee: Watts Regulator Co., North Andover, MA (US)

( * ) Notice: Subject to any disclaimer, the term of this patent is extended or adjusted under 35 U.S.C. 154(b) by 340 days.

(21) Appl. No.: 10/987,445

(22) Filed: Nov. 12, 2004

(65) Prior Publication Data

US 2005/0115875 A1   Jun. 2, 2005

Related U.S. Application Data

(60) Provisional application No. 60/519,364, filed on Nov. 12, 2003.

(51) Int. Cl.
*A61M 1/16* (2006.01)
*B01D 61/08* (2006.01)
*B01D 61/12* (2006.01)
*B01D 63/00* (2006.01)

(52) U.S. Cl. ............ 210/195.2; 210/86; 210/87; 210/117; 210/136; 210/805; 210/652; 138/43; 138/45; 138/46

(58) Field of Classification Search ............ None
See application file for complete search history.

(56) References Cited

U.S. PATENT DOCUMENTS

| | | | |
|---|---|---|---|
| 2,323,115 A | 6/1943 | Bryant | |
| 2,568,123 A | 9/1951 | Goldberg | |
| 2,658,528 A | 11/1953 | Joseph | |
| 3,095,006 A | 6/1963 | Smith | |
| 3,143,145 A | 8/1964 | Kauss | |
| 3,337,180 A | 8/1967 | Carlton | |
| 3,693,657 A | 9/1972 | Olson | 137/883 |
| 3,746,640 A | 7/1973 | Bray | |
| 3,934,812 A | 1/1976 | Pett | |

(Continued)

OTHER PUBLICATIONS

International Search Report, Patent Cooperation Treaty, International Application No. PCT/US04/37811, Aug. 9, 2004, 15 pages.

*Primary Examiner*—Krishnan S. Menon
(74) *Attorney, Agent, or Firm*—Fish & Richardson P.C.

(57) ABSTRACT

A reverse osmosis water filtering system includes a reverse osmosis membrane having first output port for permeate water, second output port for concentrate water, and intake port for receiving filtered water, a filtering assembly providing filtered water to the membrane, and a flow restrictor restricting a flow of concentrate water from the membrane to a water source, the flow restrictor including a housing defining an elongated conduit having a tapering conical wall defining a first screw thread and a water-channel thread extending therealong including generally between a first opening into a distal region of the conduit for receiving a flow of liquid and a second opening into a proximal region of the conduit, and an axially elongated plug received into the conduit, a surface of the plug opposed to the tapering conical wall defining a second screw thread and a tapering surface, the second screw thread disposed in threaded engagement with the first screw thread defined by the conical wall of the housing, opposed surface of the water-channel thread and the tapering surface of the plug being disposed in sealing engagement within the conduit and opposite to define a region for liquid flow, the housing with the water-channel thread and the tapering surface of the plug thereby cooperatively defining a generally spiral liquid flow path along the water-channel screw thread and the tapering surface, for flow of liquid generally between the first opening and a port defined by the flow restrictor for delivery of liquid from the conduit.

18 Claims, 3 Drawing Sheets

U.S. PATENT DOCUMENTS

| | | |
|---|---|---|
| 4,044,991 A | 8/1977 | Waller |
| 4,089,350 A | 5/1978 | Gustin |
| 4,344,826 A | 8/1982 | Smith |
| 4,632,359 A | 12/1986 | Tooth |
| 4,784,763 A | 11/1988 | Hambleton et al. |
| 4,997,553 A * | 3/1991 | Clack .................. 210/97 |
| 5,006,234 A | 4/1991 | Menon et al. |
| 5,082,557 A | 1/1992 | Grayson et al. |
| 5,122,265 A | 6/1992 | Mora et al. |
| 5,160,608 A | 11/1992 | Norton |
| 5,282,972 A | 2/1994 | Hanna et al. |
| 5,435,909 A | 7/1995 | Burrows |
| 5,460,716 A | 10/1995 | Wolbers |
| 5,527,433 A | 6/1996 | Begemann et al. |
| 5,565,063 A | 10/1996 | Begemann et al. |
| 5,580,444 A | 12/1996 | Burrows |
| 5,639,374 A | 6/1997 | Monroe et al. |
| 5,879,558 A | 3/1999 | Monroe et al. |
| 5,976,363 A | 11/1999 | Monroe et al. |
| 5,997,738 A | 12/1999 | Lin |
| 6,272,468 B1 | 8/2001 | Melrose |
| 6,401,758 B1 | 6/2002 | Ziv-Av |
| 6,436,282 B1 | 8/2002 | Gundrum et al. |
| 6,524,472 B2 | 2/2003 | Monroe |
| 6,524,483 B1 | 2/2003 | Monroe |
| 7,017,611 B2 * | 3/2006 | Schmitt .................. 138/43 |
| 2005/0115875 A1 | 6/2005 | Schmitt .................. 210/97 |
| 2005/0173317 A1 | 8/2005 | Schmitt .................. 210/109 |

* cited by examiner

ZERO WASTE REVERSE OSMOSIS WATER FILTERING

CROSS-REFERENCE TO RELATED APPLICATIONS

This application claims priority based un U.S. Provisional Patent Application No. 60/519,364 for A REVERSE OSMOSIS WATER FILTERING SYSTEM, filed Nov. 12, 2003, the disclosure of which is incorporated here by reference in its entirety.

This application relates to provisional application No. 60/444,864, "ONE-PIECE MANIFOLD FOR A REVERSE OSMOSIS SYSTEM", filed Feb. 4, 2003, and provisional application No. 60/456,153, "FLOW RESTRICTOR FOR A REVERSE OSMOSIS WATER FILTERING SYSTEM", filed Mar. 20, 2003, the complete disclosures of each of which are incorporated herein by reference.

BACKGROUND

A typical reverse osmosis water filtering system uses a semi-permeable membrane that has the ability to remove and reject a wide spectrum of impurities and contaminants from water. These contaminants are automatically rinsed down the drain. The purified water is then stored in a tank.

Typically, a predetermined pressure is applied to incoming water to force the incoming water through the membrane. The membrane filters impurities from the incoming water leaving purified water on the other side of the membrane called permeate water. The impurities left on the membrane are washed away by a portion of the incoming water that does not pass through the membrane. The water carrying the impurities washed away from the membrane is called "concentrate water."

SUMMARY

In one aspect, the invention features a reverse osmosis water filtering system including a reverse osmosis membrane having a first output port for permeate water, a second output port for concentrate water, and an intake port for receiving filtered water, a filtering assembly providing filtered water to the membrane, and a flow restrictor restricting a flow of concentrate water from the membrane to a water source, the flow restrictor including a housing defining an elongated conduit having a tapering conical wall defining a first screw thread and a water-channel thread extending therealong including generally between a first opening into a distal region of the conduit for receiving a flow of liquid and a second opening into a proximal region of the conduit, and an axially elongated plug received into the conduit, a surface of the plug opposed to the tapering conical wall defining a second screw thread and a tapering surface, the second screw thread disposed in threaded engagement with the first screw thread defined by the conical wall of the housing, opposed surface of the water-channel thread and the tapering surface of the plug being disposed in sealing engagement within the conduit and opposite to define a region for liquid flow, the housing with the water-channel thread and the tapering surface of the plug thereby cooperatively defining a generally spiral liquid flow path along the water-channel screw thread and the tapering surface, for flow of liquid generally between the first opening and a port defined by the flow restrictor for delivery of liquid from the conduit.

In embodiments, the plug can be received into the conduit through the second opening. The plug can define a channel interconnecting the conduit and the port. The port can be defined by the plug.

The system can include a pump configured to pump filtered water from the filtering assembly to the membrane, the membrane having a port for supplying permeate water to a tank, and a pressure switch configured, at a predetermined pressure within a tank, to disengage the pump.

The system can include at least one check valve between the flow restrictor and the water source, the at least one check value being configured to restrict water from entering the membrane from the water source due to back pressure at the water source. The flow restrictor can have a flow rate in a range of about 200 ml/m to about 300 ml/m. The water source can be a hot water source. A valve can be positioned between the pump and the membrane, wherein at the predetermined pressure, the switch can close the valve. The valve can be a solenoid valve.

The predetermined pressure can correspond to the tank being full of permeate water.

The predetermined pressure can correspond to the tank being less than full of permeate water.

In another aspect, the invention features a method of reverse osmosis water filtering including restricting a flow of concentrate water from a membrane to a water source.

In embodiments, the method can include sensing pressure within a tank, the tank receiving permeate water from the membrane. A disengaging a pump from pumping filtered water to the membrane can be employed when the pressure within the tank can be at a predetermined pressure. Closing a valve between the pump and the membrane when the pressure can occur at a predetermined temperature.

In another aspect, the invention features a flow restrictor defining a restricted flow path for liquid, the flow restrictor including a housing defining an elongated conduit having a tapering conical wall defining a first screw thread and a water-channel thread extending therealong including generally between a first opening into a distal region of the conduit for receiving a flow of liquid and a second opening into a proximal region of the conduit, and an axially elongated plug received into the conduit, a surface of the plug opposed to the tapering conical wall defining a second screw thread and a tapering surface, the second screw thread disposed in threaded engagement with the first screw thread defined by the conical wall of the housing, opposed surface of the water-channel thread and the tapering surface of the plug being disposed in sealing engagement within the conduit and opposite to define a region for liquid flow, the housing with the water-channel thread and the tapering surface of the plug thereby cooperatively defining a generally spiral liquid flow path along the water-channel screw thread and the tapering surface, for flow of liquid generally between the first opening and a port defined by the flow restrictor for delivery of liquid from the conduit.

In embodiments, the plug can be received into the conduit through the second opening. The plug can define an aperture interconnecting the conduit and the port. The port can be defined by the plug. The plug and the housing can be injection molded. The plug can include a first material, the insert can include a second material, the first material being softer than the second material. The screw-thread can include a pointed protrusion. Being disposed in sealing engagement can include the pointed protrusion penetrating the surface of the tapered surface. The plug can include a third screw thread, the second screw thread and the third screw thread can be separated by a gap.

Other features and advantages of the invention are apparent from the following description, and from the claims.

DETAILED DESCRIPTION

Like reference numbers and designations in the various drawings indicate like elements.

Figure 1:
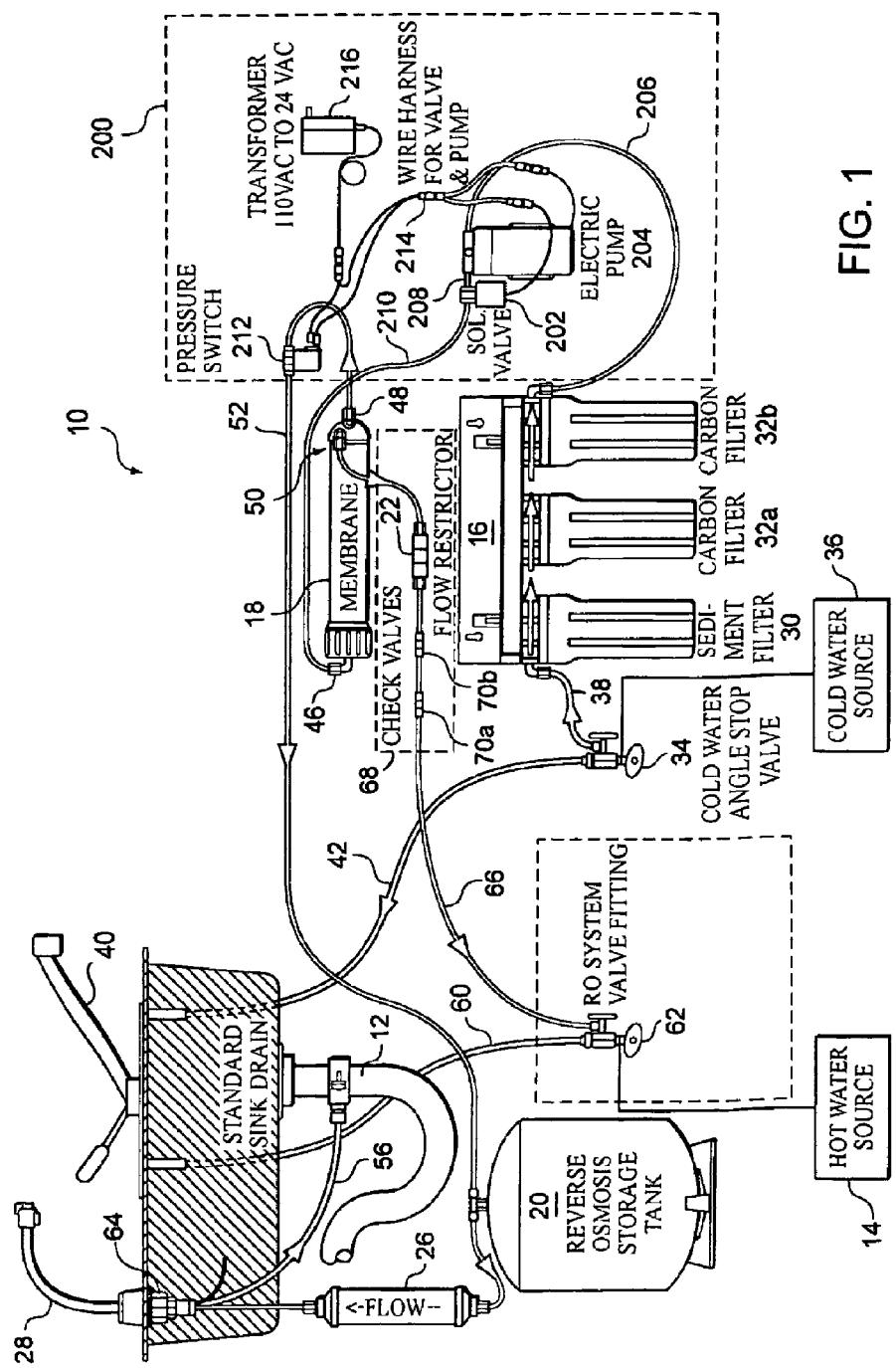
FIG. 1 is an elevation view of an exemplary embodiment of a zero waste reverse osmosis water filtering system constructed in accordance with the present disclosure.

As shown in FIG. 1, a zero waste reverse osmosis (ZWRO) water filtering system 10 includes rerouting concentrate water from disposal as waste down a drain 12 to a hot water source 14 to be used again thereby conserving water. System 10 includes a filtering assembly 16, a reverse osmosis membrane 18, a reverse osmosis storage tank 20, a flow restrictor 22, a carbon filter 26 and, in one particular example, an air gap faucet 28. One particular example of a suitable reverse osmosis membrane 18 is manufactured by Applied Membranes, Inc. of Vista, Calif. under part number MT1812P24.

Filtering assembly 16 includes a sediment filter 30 and carbon filters 32a, 32b. Intake water enters system 10 from a cold water angle stop valve 34, connected to a cold water source 36, and is routed through an intake tube 38 to filtering assembly 16. Cold water angle stop valve 34 is connected to a faucet 40 through a cold water faucet line 42 providing cold water to the faucet 40.

Sediment filter 30 removes sediment such as sand and dirt and the like from the intake water. Carbon filters 32a, 32b remove chlorine and other contaminants that can cause bad color, odor and/or taste.

Reverse osmosis membrane 18 includes an intake port 46, a permeate outlet port 48 and a concentrate outlet port 50.

When air gap faucet 28 is opened by a user, permeate water is forced from reverse osmosis storage tank 20 and through the carbon filter 26, though the air gap faucet 28, for use by the user.

To provide for zero waste reverse osmosis water filtering, a user turns off the supply of hot water from hot water source 14 and the supply of cold water from cold water source 36 by closing a hot water valve and a cold water angle stop valve 34. The user drains reverse osmosis storage tank 20 by opening air gap faucet 28. Pressure in reverse osmosis storage tank 20 forces permeate water from the reverse osmosis storage tank 20 and through the air gap faucet 28. Hot water supply line 60 supplies hot water to faucet 40 from hot water source 14 and includes a hot water angle stop valve 62, which is similar to cold water angle stop valve 34. In one particular example, a suitable valve for the hot water angle stop valve 62 is manufactured by CNC of Taipei, Taiwan under part number 32175682CNC.

Hot water supply line 60 is connected to hot water angle stop valve 62, A tube assembly 66 is attached and includes a flow restrictor 68 and two check valves 70a, 70b. One end of tube assembly 66 having flow restrictor 68 is attached to concentrate outlet port 50 of reverse osmosis membrane 18 and the other end of the tube assembly 66 is connected to hot water angle stop valve 62. Flow restrictor 68 offsets any back pressure from the hot water source 14. In one particular example, a flow rate of flow restrictor 68 is between 200 milliliters per meter (ml/m) to 300 ml/m. Check valves 70a, 70b restrict hot water from hot water source 14 from entering reverse osmosis membrane 18 due to any back pressure that can occur. In one example, a suitable check valve is manufactured by John Guest USA Inc. of Pine Brook, N.J. under part number ¼SCV.

Figure 2:
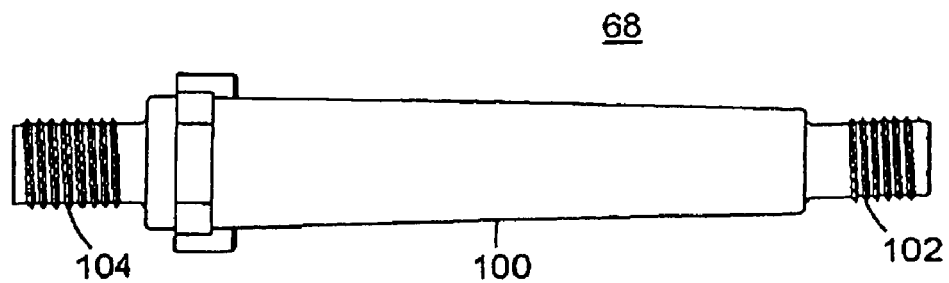
FIG. 2 is a side elevation view of an exemplary embodiment of a flow restrictor constructed in accordance with the present disclosure for use with the system of FIG. 1.
Figure 3:
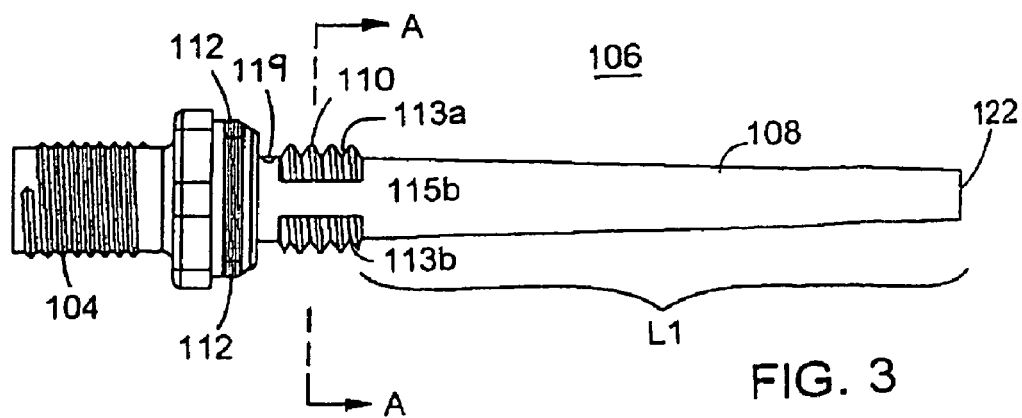
FIG. 3 is a side elevation view of a plug of the flow restrictor of FIG. 3.
Figure 4:
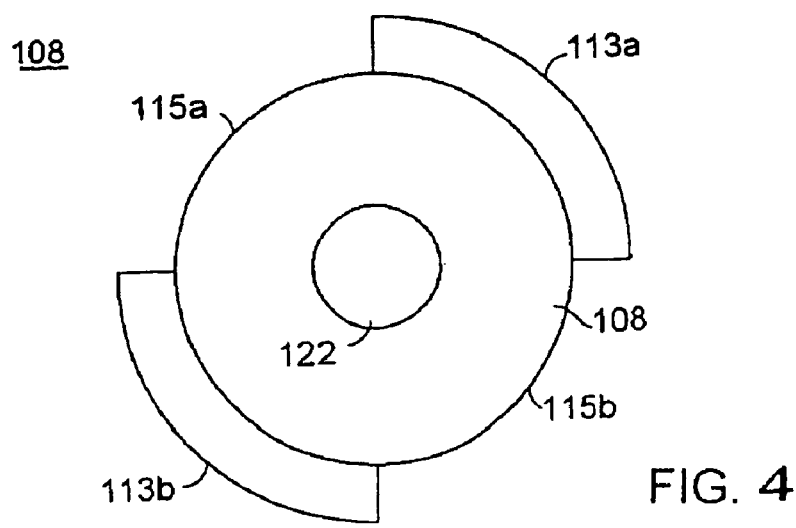
FIG. 4 is a an end elevation view of the plug of FIG. 3.
Figure 5:
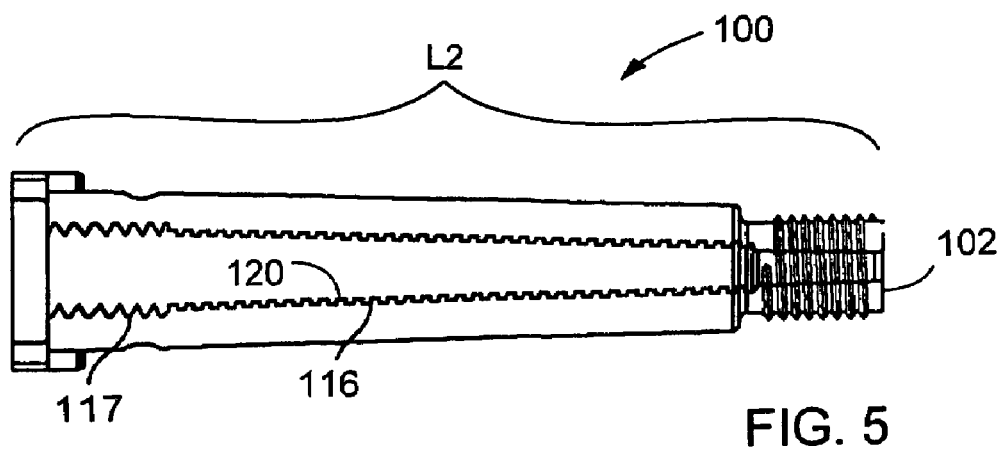
FIG. 5 is a side elevation view of a housing of the flow restrictor of FIG. 3.
Figure 6:
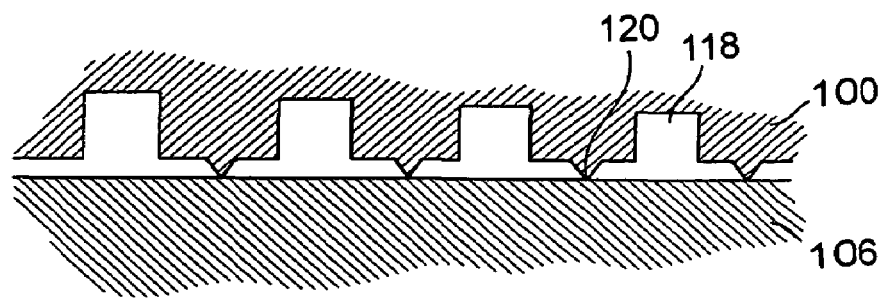
FIG. 6 is a is an enlarged sectional view showing internal threads of the housing engaging a smooth outer surface of the plug to form a sealed spiral flow path when the plug is screwed into the housing.

As shown in FIG. 2, flow restrictor 68 includes a main body 100, a threaded distal end 102 and a threaded proximal end 104.

As shown in FIGS. 3, 4, 5 and 6, the main body (e.g., housing or insert) 100 receives a plug 106. Plug 106 includes a tapered shaft 108 having a length L1 (e.g., about 1.5 inches), a screw thread section 110, an O-ring 112 defining an aperture 119, which leads to a hollow cavity at the proximal end 104. Tapered shaft 108 has a taper angle of approximately 1.5°. Screw thread section 110 includes screw threads 113a and 113b separated from one another by a first gap 115a and a second gap 115b. Without gaps 115a and 115b, screw threads 113a and 113b would form one continuous thread around the circumference of plug 106. Each gap 115a and 115b extends 90° about the circumference of plug 106. Plug 106 is made of suitable material such as polyethylene and the like.

Housing 100, having a length, L2, (e.g. about 3 inches), includes screw thread 117 and water-channel thread 116. Water-channel thread 116 includes a pointed end 120, with a gap 118 between the thread that is a part of a water-flow path. Housing 100 is made of a suitable material such as ABS plastic and the like.

Plug 016 and housing 100 are interengaged by screw threads 113a and 113b with screw thread 117, which together with the O-ring 112 provide a water tight seal. Tapered shaft 108 extends into housing 100 about three quarters of its length, L2. Flow restrictor 68 is constructed in a fashion that water-channel thread 116 seals around tapered shaft 108 to provide a sealed gap 118 forming a spiral flow path for water along and around the tapered shaft 108. In particular, point 120 of water channel thread 116 slightly penetrates into an opposed surface of the tapered shaft 108 to ensure a tight seal.

A flow path of water through flow restrictor 68 starts at distal end 102 of the housing 100 and continues until water comes in contact with the tip region 122 of the tapered shaft 108. A volume occupied by tapered shaft 108 within housing 100 directs the water into sealed gap 118. The water continues to spiral around and along the tapered shaft 108 following the water-channel thread 116 until the water reaches the threads. In this particular example, the water is forced through gaps 115a, 115b and through the aperture 119 and out the proximal end 104 of plug 106. In other particular examples, the flow can be restricted in the opposite direction.

The flow path cross section is designed to restrict water flow using capillary characteristics of water, while at the same time providing a large enough flow cross section to prevent small particles from clogging the flow path.

The tapering of body 100 from the proximal end 104 to the tip region 122, and the use of water-channel thread 116, allows the flow restrictor 68 to be injected molded very easily and inexpensively. For example, after plug 106 is injected molded, it can be easily released from a mold by rotating the plug 106 a few turns and then drawing the plug 106 from the mold. Tooling also allows the flow restrictor 68 to be configured for "stand alone" use as a flow restrictor for most common reverse osmosis water filtration systems.

As described above, water-channel thread 116 within flow restrictor 68 controls the flow of the water by generating a capillary action around tapered shaft 108 to restrict the flow of water. Advantageously, the flow restrictor 68 restricts the water unlike traditional winding tube designs. The length, i.e., pitch, of the thread can be altered to change a degree of flow restriction.

In other particular examples, the length, L1, of tapered shaft 108 can be modified to control flow rate. For example, housing 100 can have the same dimensions, thus saving manufacturing costs, and the length of plug 100 can be modified to be shorter to increase the flow rate through the flow restrictor 68, or longer to reduce the flow rate through the flow restrictor 68.

Referring again to FIG. 1, a valve-pump assembly 200 is fitted between reverse osmosis membrane 18 and filtering assembly 16. Valve-pump assembly 200 includes a solenoid valve 202, a pump 204, a pump intake tube 206, a valve-pump tube 208 that allows water to flow between the pump 204 and the solenoid valve 202, a valve outlet tube 210, a pressure switch 212 electrically connected to the pump 204 and the solenoid valve 202 by a wire harness 214, and a transformer 216 that supplies power to the pump 204, the pressure switch 212, and the solenoid valve 202. The user connects valve-pump assembly 200 by connecting pump intake tube 206 to the filtering assembly 16 and connecting valve outlet tube 210 to inlet port of reverse osmosis membrane 18.

The permeate tube 52 is connected to pressure switch 212. Transformer 216 is connected to a suitable source of power, such as to a wall outlet. In one particular example, transformer 216 is a 110 VAC to 24 VAC rated transformer.

In operation, when a user opens air gap faucet 28, the permeate water in reverse osmosis storage tank 20 is forced from the reverse osmosis tank 20 by the pressure within the tank reverse osmosis storage tank 20. As reverse osmosis storage tank 20 is being depleted of permeate water, pressure switch 212 detects that the pressure within the reverse osmosis storage tank 20 is below a predetermined pressure that corresponds to the reverse osmosis storage tank 20 being filled. Pressure switch 212 electrically opens solenoid valve 202 and electrically engages pump 204 to pump filtered water received from filtering assembly 16 through the open solenoid valve 202 through outlet valve tube 210 to reverse osmosis membrane 18.

Pump 204 continues pumping filtered water to reverse osmosis membrane 18 until pressure switch 212 detects that the pressure within reverse osmosis tank 20 has reached a predetermined level corresponding to reverse osmosis storage tank 20 being full (e.g., approximately 30 pounds per square inch (psi)). At the predetermined pressure, pressure switch 212 electrically disengages pump 204 from pumping filtered water from filter assembly 16 to reverse osmosis membrane 18 and closes solenoid valve 202.

System 10 is not limited to any one particular configuration described above. For example, the filtering assembly 16 can allow access between sediment filter 30 and the carbon filters 32*a*, 32*b*. In this configuration, pump 204 and solenoid valve 202 are positioned between the sediment filter 30 and carbon filters 32*a*, 32*b*.

In another example of system 10, an additional filter can be added after reverse osmosis membrane 18 and prior to entering hot water source 14 to filter the concentrate water.

In still another example, a pressure signal to disengage the pump 204 at a "full" tank condition is triggered at a predetermined pressure set at less than tank capacity. A signal of tank capacity can alternatively be triggered (e.g., by a float or other volume indicator device).

In still another example, system 10 can include replacing flow restrictor 22 with another flow restrictor that has twice the flow rate of flow restrictor 22.

The flow restrictor 68 can be adapted to a variety of reverse osmosis systems. For example, flow restrictor 68 can be modified for use in a reverse osmosis system constructed as a one-piece manifold. In this example, the plug does not include the aperture or the hollow proximal end so that the water is directly routed through gaps directly into the one-piece manifold.

In other examples, the tapered shaft 108 has a taper angle between 0.5 degrees to 2.0 degrees.

In further examples, concentrate water is routed to any potable water source.

It is to be understood that the foregoing description is intended to illustrate and not to limit the scope of the invention, which is defined by the scope of the appended claims. Other embodiments are within the scope of the following claims.

What is claimed is:

1. A reverse osmosis water filtering system, comprising:
   a reverse osmosis membrane having a first output port for permeate water, a second output port for concentrate water, and an intake port for receiving water from a water source; and
   a flow restrictor for restricting a flow of concentrate water from the membrane to a water source, the flow restrictor comprising:
   a housing defining an elongated conduit having a tapering conical wall defining a first screw thread and a water-channel thread extending therealong including generally between a first opening into a distal region of the conduit for receiving a flow of liquid and a second opening into a proximal region of the conduit, and
   an axially elongated plug received into said conduit, with a surface of said plug opposed to said tapering conical wall defining a second screw thread and a smooth tapering surface, said second screw thread disposed in threaded engagement with said first screw thread defined by said tapering conical wall of said housing, and opposed surfaces of said water-channel thread of said housing and said tapering surface of said plug being disposed in sealing engagement within said conduit, said water-channel thread of said housing and said tapering surface of said plug cooperatively defining a generally spiral liquid flow path along said conduit for flow of liquid generally between said first opening and a port defined by said flow restrictor for delivery of liquid from said conduit,
   wherein said plug comprises first material, said housing comprises second material harder than the first material, and sealing engagement comprises penetrating engagement of said water-channel thread of said housing with said tapering surfaces of said plug.

2. The system of claim 1, wherein said plug is received into said conduit through said second opening.

3. The system of claim 1, wherein said plug, at least in part, defines an aperture interconnecting said conduit and said second output port.

4. The system of claim 3, wherein said port is defined, at least in part, by said second plug.

5. The system of claim 1, further comprising:
a pump configured to pump filtered water from the filtering assembly to the membrane;
a tank receiving permeate water from the first output port of the membrane; and
a pressure switch configured, at a predetermined pressure within the tank, to disengage the pump.

6. The system of claim 1, further comprising:
at least one check valve for communication between the flow restrictor and the water source, the at least one check value configured to restrict water from entering the flow restrictor from the water source due to back pressure at the water source.

7. The system of claim 1, wherein the flow restrictor has a flow rate in a range of about 200 ml/m to about 300 ml/m.

8. The system of claim 1, wherein a hot water source is connected of the flow restrictor.

9. The system of claim 5, further comprising a valve positioned between the pump and the membrane, wherein, at the predetermined pressure, the switch closes the valve.

10. The system of claim 9, wherein the valve is a solenoid valve.

11. The system of claim 5, wherein the predetermined pressure corresponds to the tank being full of permeate water.

12. The system of claim 5, wherein the predetermined pressure corresponds to the tank being less than full of permeate water.

13. The flow restrictor of claim 1, wherein said plug and said housing are injection molded.

14. The system of claim 1, wherein said plug comprises a first material, said insert comprises a second material, said first material being softer than said second material.

15. The system of claim 1, wherein the screw-thread comprises at least one protrusion.

16. The system of claim 15, wherein being disposed in sealing engagement comprises penetration of the pointed protrusion into the tapered surface.

17. The system of claim 1, wherein the plug comprises a third screw thread, the second screw thread and the third screw thread are separated by a gap.

18. The system of claim 1, further comprising a filtering assembly for filtering water from the water source prior to delivery into the intake port of the membrane.

* * * * *